United States Patent [19]

Zipser et al.

[11] 4,088,231
[45] May 9, 1978

[54] APPARATUS FOR REPOSITIONING BALES ON A BALE WAGON

[75] Inventors: Randall E. Zipser, Fresno; Gene R. Butler, Kingsburg; Donald M. Grey, Selma, all of Calif.

[73] Assignee: Sperry Rand Corporation, New Holland, Pa.

[21] Appl. No.: 716,913

[22] Filed: Aug. 23, 1976

[51] Int. Cl.² ............................................. B65G 57/32
[52] U.S. Cl. .................................... 214/6 B; 198/458
[58] Field of Search ...................... 214/6 B, 6 P, 518; 198/456, 458

[56] References Cited

U.S. PATENT DOCUMENTS

| | | | |
|---|---|---|---|
| 3,549,023 | 12/1970 | Backman | 214/6 B |
| 3,724,684 | 4/1973 | Butler et al. | 214/6 B |
| 3,812,951 | 5/1974 | Fullaway | 198/458 |

*Primary Examiner*—Drayton E. Hoffman
*Assistant Examiner*—Ross Weaver
*Attorney, Agent, or Firm*—John B. Mitchell; Frank A. Seemar; Joseph A. Brown

[57] ABSTRACT

A bale wagon has improved apparatus for repositioning selected bales on its second, tier-forming table so as to provide a generally even stack side on the bale loader side of the bale wagon. The apparatus includes a frame slidably mounted on the underside of the second table adjacent to the bale loader side thereof and a pair of bale-engaging cleats mounted on the frame and extending upwardly through elongated slots formed in the second table. The frame is slidable along a generally linear path which angles toward the forward right corner of the second table and is interconnected to a first, bale-receiving table of the bale wagon through a cable and pulley system. A spring biases the slidable frame to an outer position toward the loader side of the second table. When the first table pivots upwardly during delivery of bales to the second table, the cable pulls the frame to slidably move the same along its linear path to an inner position toward the longitudinal centerline of the second table which results in compression of the spring. Once the bales have been deposited on the second table and the first table begins its descent back to its lower position, the cable slackens allowing the spring to pull the slidable frame back to its outer position during which the cleats on the frame engage and move an overlying bale along the angled linear path toward the loader side of the second table and away from any other bales adjacent thereto.

4 Claims, 9 Drawing Figures

APPARATUS FOR REPOSITIONING BALES ON A BALE WAGON

BACKGROUND OF THE INVENTION

1. Field of the Invention

The present invention generally relates to the art of forming a stack of crop material bales and, more particularly, is concerned with a bale wagon incorporating an improved apparatus for repositioning selected bales on a tier-forming table of the bale wagon.

2. Description of the Prior Art

Under normal operating conditions, most balers are unable to produce bales having a precise standard length. When such bales which vary somewhat in length are picked up and formed into a stack on a bale wagon of the type which employs the three-table concept, such as originally disclosed in U.S. Pat. No. 2,848,127 to G. E. Grey, the side of the stack at the first table trip arm side of the bale wagon is generally even, while the opposite side of the stack at the bale loader side of the bale wagon is very uneven.

The reasons why this situation occurs and the problems associated therewith when stacking bales of nonstandard lengths, particularly where some of the bales are significantly shorter than others, are thoroughly discussed in U.S. Pat. No. 3,724,684 to G. R. Butler and G. L. Sipe. This latter patent proposed two embodiments of a bale relocator mechanism for rectifying this situation.

In one embodiment of the mechanism, a finger-like structure is pivotally mounted below the tier-forming table for arcuate lateral movement through an opening in the table and a hydraulic cylinder is provided for pivoting the finger structure through its arcuate path of movement during which the finger structure is to engage the underside of a bale overlying the opening and move the bale toward the bale loader side of the table. The other embodiment of the mechanism is mounted on the bale-receiving or first table of the bale wagon adjacent the bale loader. A pair of finger structures are pivotally mounted on a connecting rod and normally positioned below the bale supporting surface of the first table. When the first table begins its upward pivotal movement to deliver the bales resting thereon to the tier-forming or second table, the connecting rod is moved laterally such that the finger structures carried thereby ride up cam surfaces and are caused to pivot upwardly through arcuate paths into engagement with the overlying bale.

However, sometimes, neither of these two embodiments adequately reposition the respective bale. The respective finger structures in being moved through an arcuate lateral path into engagement with the bale each have a tendency to tear through the bottom portion of the bale or lift the bale and just slide along its underside without substantially moving it laterally as desired. The effectiveness of the finger structure of the embodiment of the mechanism mounted on the second table in causing the lateral relocation of the overlying bale is sometimes impeded by the engagement of that bale with a bale positioned just rearwardly thereof. The arcuate lateral movement of the finger structure tends merely to pivot both bales as a unit rather than cause sliding of the front bale transversely toward the second table side and relative to the rear bale.

To summarize, while both embodiments of the bale relocator mechanism disclosed and claimed in U.S. Pat. No. 3,724,684 represent significant steps toward rectification of the problems which arise during the stacking operation on a Grey bale wagon when short bales are encountered, they still fall short of providing the optimum solutions for these problems.

SUMMARY OF THE INVENTION

The present invention provides an improved apparatus for respositioning selected bales on the tier-forming table of the bale wagon which incorporates several features which substantially allievate the difficulties experienced with the prior art bale relocator mechanism embodiments of U.S. Pat. No. 3,724,684.

Particularly, the improved apparatus includes a frame which is mounted for sliding movement relative to the tier-forming table along a generally linear path and at least one, and preferably two elements, each being mounted on and extending upwardly from the frame and through an elongated opening in the table to where it engages the underside of a bale overlying the opening and moves the bale along the path of movement of the frame to reposition the same. Further, the generally linear path along which the frame and bale-engaging elements move extends at an angle away from other bales on the tier-forming table which allows for repositioning of the bale without interference with the other bales.

Also, the improved apparatus includes yieldable means in the form of a compression spring mounted below the tier-forming table and connected to the slidable frame so as to bias the frame and thereby the bale-engaging elements thereon toward the bale loader side of the tier-forming table and thus toward the outer location on the table to where the bale is to be repositioned. Still further, the improved apparatus includes a cable or the like which interconnects the slidable frame to the bale-receiving or first table such that the upward motion of the first table in delivering bales to the tier-forming or second table pulls on the cable which, in turn, pulls the frame along its linear path away from the loader side of the second table and causes compression of the spring. Then, once the bales have been deposited on the second table with one bale thereof overlying the openings and engaged by the elements of the improved apparatus extending upwardly through the openings, descent of the first table back downwardly to its lower position progressively releases the pulling force imposed on the slidable frame and concurrently as the force releases, the compressed spring extends and pulls the frame and the bale-engaging elements therewith toward the side of the second table which moves the bale and repositions the same at the outer location. The velocity of movement of the slidable frame and bale-engaging elements is thus advantageously controlled by the downward descent of the first table and not by the action of a hydraulic cylinder, as in the case of the prior art, the latter being almost instantaneous.

The bale-engaging elements take the form of cleats which are each pivotally mounted on the slidable frame and biased by a spring toward an upright position against stops on the frame. The springs hold the respective cleats in the upright positions against the stops as the frame moves toward the side of the second table and yield to allow the cleats to deflect away from the stops and downwardly toward generally horizontal positions in which the cleats will slide under and relative to the repositioned bale as the frame moves back away from the side of the second table when more bales are delivered to the second table by the upward pivotal motion of the first table. Consequently, the depressed or deflected cleats in being moved away from the loader side of the second table will not interfere with the repositioned bale overlying the cleats as it is concurrently pushed rearwardly on the second table by another bale being delivered onto the second table by the first table into the position overlying the second table openings.

The outer position or location on the second table to which short bales are repositioned is bounded on its outer side by a side rail mounted to the loader side of the second table. Therefore, if the bale which is moved onto the second table into overlying relationship with respect to the openings of the table and the cleats which extend therethrough happens to be of standard length or somewhat longer, the cleats will only move the bale, if at all, until it contacts the side rail. If the bale has abutted the rail, before the spring biasing the slidable frame has completely extended, the material of the bale may hold the cleats stationary and thereby prevent full extension of the spring. However, such occurrence merely causes a small amount of slack in the cable interconnecting the slidable frame and the first table and does not interfere with the first table's descent back to its lower position.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

In General

Figure 1:
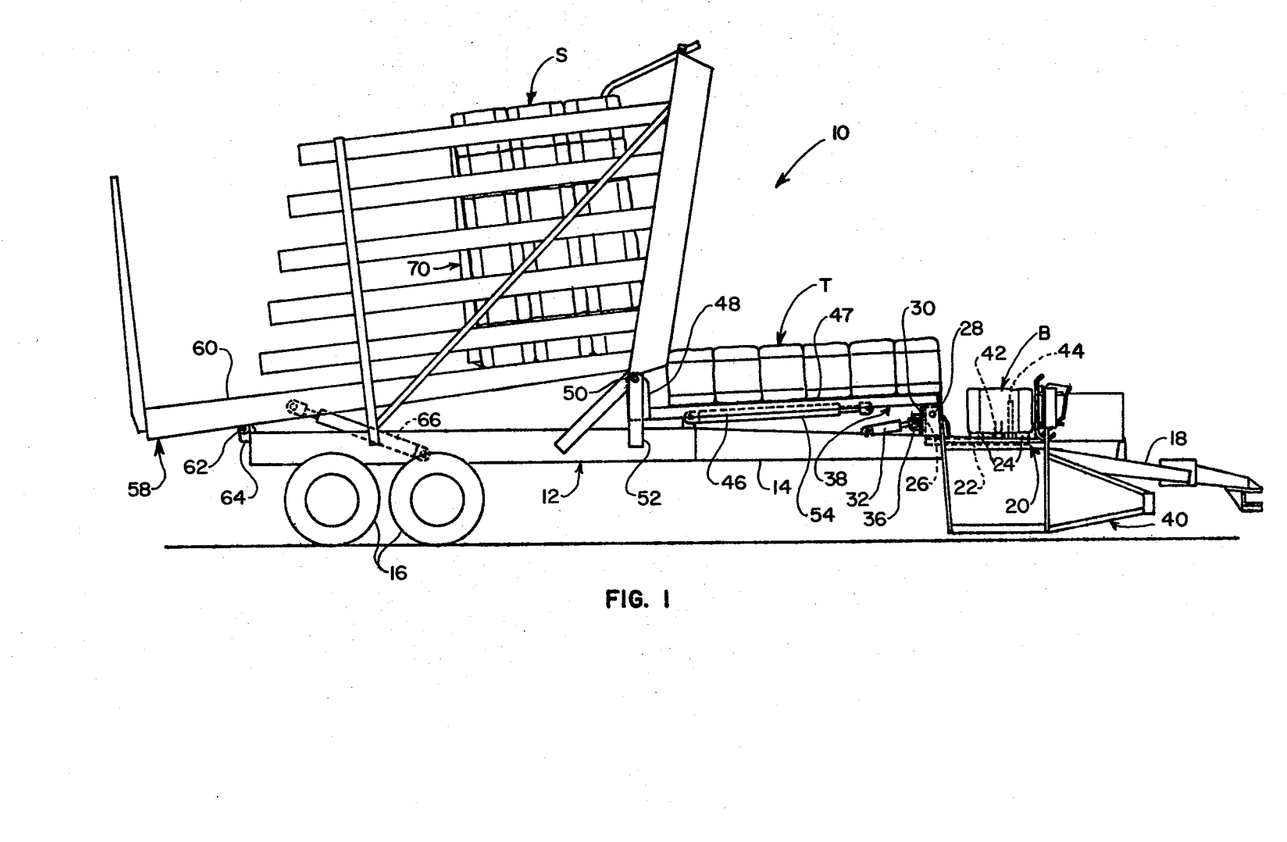
FIG. 1 is a side elevational view of a bale wagon incorporating the bale repositioning apparatus which comprises the improvement provided by the present invention.

Referring now to the drawings, and particularly to FIG. 1, there is shown a bale wagon, being indicated generally by the numeral 10, for forming a stack of bales and incorporating the preferred embodiment of the improvement provided by the present invention.

The bale wagon 10 is provided with a mobile chassis, indicated generally as 12, formed of right and left longitudinally extending channels 14 (see FIG. 2), suitably interconnected by spaced transverse channels (not shown), and right and left pairs of tandemly-arranged wheels 16 (only the right rear wheel being shown) for movably supporting the interconnected longitudinal channels 14. The forward ends of the channels 14 converge in a clevis assembly 18 which adapts the wagon 10 to be secured to a tractor, or other towing vehicle, located at the front of the wagon 10. Although the wagon illustrated is a pull-type wagon, it could readily take the form of a self-propelled type.

Mounted near the forward end of the mobile chassis 12, immediately rearwardly of the clevis assembly 18 and extending transversely thereto, is means for receiving bales, generally indicated by the numeral 20 and hereinafter referred to as a first, bale-receiving table of the wagon 10. The first table 20 is formed by an L-shaped structure having a forwardly-extending horizontal portion 22 on which is mounted two transversely extending spaced beams 24. The L-shaped structure also has a rear upwardly extending leg portion 26 which is pivotally secured at 28 between spaced-apart upstanding right and left front brackets 30 (only the right bracket being shown) respectively mounted on the longitudinal channels 14. A hydraulic cylinder 32 is pivotally secured at its anchor end to a bracket member (not shown) mounted on the chassis 12. The rod end of the hydraulic cylinder 32 is pivotally secured to the free end of an arm 36 which is fixedly secured to, and extends rearwardly from, the L-shaped structure of the first table 20. As the hydraulic cylinder 32 is extended, the first table 20 will swing or pivot approximately 90° upwardly about its pivot point 28 transferring any bales B which have been received on the first table 20 onto the forward end of a second, tier-forming table, being generally indicated by numeral 38.

It will be understood by those skilled in the art, that bales are first introduced to the first table 20 by means of a bale loader or pickup, generally indicated at 40, which is mounted to the chassis 12 at the right end of the first table 20 and operative to lift bales from the ground and direct them through a generally 90° arcuate lateral path to the right receiving end of the first table 20. The loader 40, well known in the art, is generally similar to the one illustrated and described in U.S. Pat. No. 2,848,127 and need not be illustrated and described in detail herein for a thorough and clear understanding of the present invention.

Also, it will be understood by those skilled in the art, that a cross conveyor 42 is operatively mounted to the chassis 12 and longitudinally extends between, along, and slightly above the level of, the two spaced beams 24 of the first table 20 (when the table is in its lower horizontal position) from approximately the right receiving end to near the middle of the beams 24 for advancing the bales laterally from the loader 40 toward the left end of the first table 20. The cross conveyor 42, also well known in the art, is generally similar to the one illustrated and described in U.S. Pat. No. 2,848,127 and need not be illustrated and described in detail herein for a thorough and clear understanding of the present invention.

The first table 20 is capable of receiving a predetermined number of bales, preferably three bales, successively at a given time from the bale loader 40. After receiving the three bales in end-to-end arrangement from the loader 40, an outer bale trip arm or lever 44 located at the left end of the first table 20 is engaged and pivoted laterally outward by the leading end of the first of the three bales being advanced toward the left end of the first table 20 by the cross conveyor 42. Such pivoting of trip arm 44 causes actuation of the hydraulic cylinder 32 through suitable trip mechanism and hydraulic components coupled thereto and thereby extension and retraction of the hydraulic cylinder 32 which, in turn, causes pivotal movement of the first table 20 from a lower, bale-receiving position (FIG. 1) to an upper, bale-discharge position adjacent the second table 38 and back to the lower position. The trip mechanism and hydraulic components which intercouple the trip arm 44 to the hydraulic cylinder 32 are well known in the art and need not be illustrated and described in detail herein for a thorough and clear understanding of the present invention. Thus, the first table 20 will successively receive and transfer three bales arranged end-to-end in a row to the second table 38 until a full tier has been formed thereon.

The second, tier-forming table 38 is formed by an L-shaped structure having a forwardly extending leg portion 46 across which is fixed a platform assembly 47 upon which bales are accumulated and formed into a tier and an upwardly extending rear leg portion 48 which is pivotally secured at 50 between spaced apart upstanding brackets 52 (FIG. 2) mounted on the longitudinal channels 14. A hydraulic cylinder 54 is pivotally secured at its anchor end to the chassis 12 and its rod end is pivotally secured to the underside of the leg portion 46 of the L-shaped structure of the second table 38.

When the second table 38 is in its normal horizontal tier-forming position, as shown in FIG. 1, it rests at its forward end on a transverse support member fixed across the upstanding right and left front brackets 30. When the requisite number of rows of bales have been accumulated and formed on the second table 38 into a tier T, the hydraulic cylinder 54 is actuated so as to extend and cause the table 38 to swing or pivot upwardly generally 90° about its pivot point 50 to a generally vertical position (FIG. 2) adjacent the front end of the rearwardly disposed tier-accumulating means hereinafter referred to as the load bed, or third load table, being generally indicated by the numeral 58. In this manner, the tier of bales formed on the second table 38 is transferred to a vertically standing position on front end of the load bed 58.

It will be understood by those skilled in the art, that trip means (not shown) is located near the rear end of the second table 38, which is engaged by the rearmost bales in the tier when the tier is completely formed and causes actuation of the hydraulic cylinder 54 and thereby pivotal movement of the second table 38. The structure and function of the second table trip means are well known in the art and need not be illustrated and described herein for a thorough and clear understanding of the present invention.

The load-carrying bed 58 includes a platform assembly 60 which is pivotally mounted at 62 between spaced apart upstanding rear brackets 64, only the right one being shown in FIG. 1, mounted on the longitudinal channels 14. A pair of spaced apart hydraulic cylinders 66, only the right one being shown, are pivotally secured at their anchor ends to the chassis 12 and at their rod ends to the platform assembly 60. When the load bed 58 is in its normal, generally horizontal tier-receiving position, as shown in FIG. 1, it rests at its forward end on a transverse member (not shown) which extends between upstanding brackets 52. A stack of bales S is progressively formed on the load bed 58 upon successive delivery thereto of tiers of bales by pivotal movement of the second table 38 from its normal horizontal tier-forming position of FIG. 1 to its generally upright position adjacent the forward end of the load bed 58.

As the first bale tier is delivered or deposited onto the load bed 58, a fore-and-aft movable rolling rack, being generally indicated by the numeral 70, is contacted by the tier and forced to move rearwardly along the load bed 58. It will be understood by those skilled in the art, that while the rolling rack 70 is spring biased to move toward the forward end of the load bed 58, the bias of the spring means is overcome with the delivery of each successive bale tier from the second table 38 to the front end of the load bed 58 whereby the rolling rack 70 is forced to move rearwardly one bale width until the rack 70 reaches a rearmost position along the load bed 58, whereupon a complete stack has been formed on the load bed 58. The structure and function of the rolling rack 70, well known in the art, is generally similar to that illustrated and described in U.S. Pat. No. 2,848,127 and need not be illustrated and described in detail herein for a thorough and clear understanding of the present invention.

When the load bed 58 has been fully loaded, the stack can be transferred to the ground in the form of a composite stack by extension of the hydraulic cylinders 66 which causes the load bed 58 to pivot generally 90° about point 62 from its generally horizontal position of FIG. 1 to an upright position in which the rolling rack 70 and the rear end of the load bed 58 are disposed adjacent the ground.

Improved Apparatus for Repositioning Bales on the Bale Loader Side of the Second Table The ability of the stack thus formed on the bale wagon 10 to stand over long periods of time when placed upright on the ground depends greatly upon proper positioning of the bales in each tier during the formation of the stack on the bale wagon 10 such that each tier formed, which eventually becomes each of the various horizontal layers of bales in the standing stack, will provide adequate support for the tiers disposed thereabove. When the opposite lateral sides of the stack are each relatively even, each tier will generrly provide sufficient support for the tiers disposed above it and the quality of the stack in terms of its ability to stand over long periods of time and to be retrieved will be greatly enhanced.

The outer bale trip arm 44 located at the left end of the first table 20 and being provided for actuating the first table 20 for delivering bales to the front end of the second table 38 insures that the left ends of the respective transverse rows of bales transferred to the second table 38 are more or less even with each other. Therefore, because of the proper functioning of the first table trip arm 44, the side of the stack along the first table arm side of the bale wagon is relatively even.

However, the first table trip arm 44 causes cycling of the first table 20 without regard to the relative positions of the right ends of the respective rows of bales transferred by the first table 20. Consequently, when the bale wagon 10 periodically picks up a short bale, or one of less than standard length, the net result is that the right ends of the respective transverse rows of bales transferred to the second table 38 become misaligned or uneven and thus the bale loader side of the stack on the bale wagon 10 opposite to the first table trip arm side becomes very uneven.

Viewing FIGS. 2 through 5, it will be observed that apparatus, being indicated generally as 72 and constituting the improvement of the present invention, is provided for repositioning a selected bale on the second table 38 located adjacent the bale loader side of the bale wagon 10 whenever a short bale is encountered within each end-to-end row of bales transferred by the first table 20 to the forward portion of the platform assembly 47 of the second table 38.

Figure 3:
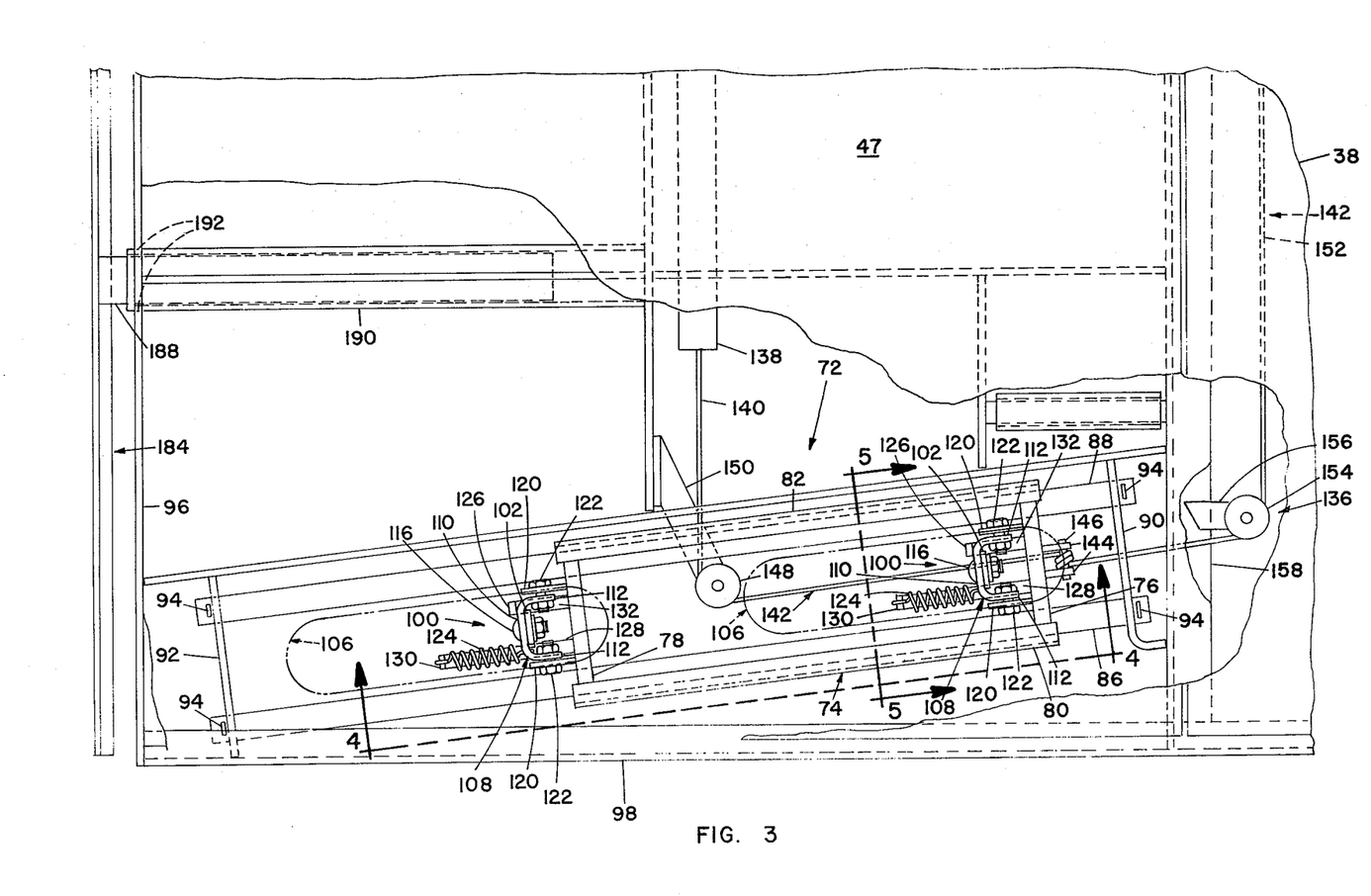
FIG. 3 is an enlarged, fragmentary top plan view of the second table of the bale wagon of FIG. 1; illustrating the forward right corner portion of the second table with portions of its bale-supporting platform broken away to more clearly expose the structure of the improved apparatus.
Figure 5:
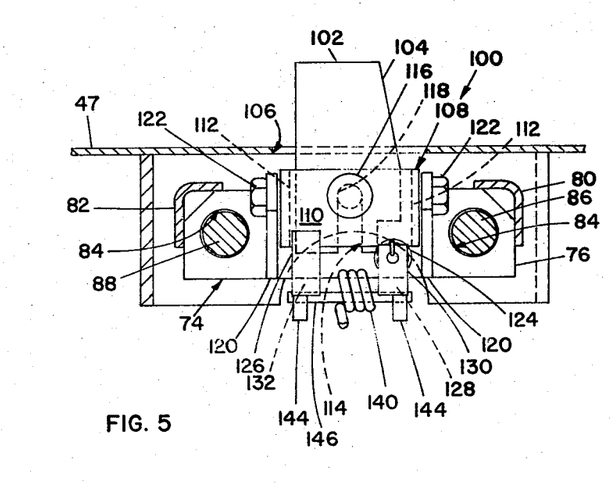
FIG. 5 is an enlarged end elevational view taken along line 5—5 of FIG. 4.

In its preferred form, the improved apparatus 72 is mounted to the underside of the second table platform assembly 47 in the general vicinity of the front right corner portion thereof, as illustrated in FIG. 3. The apparatus 72 includes a frame, generally designated as 74, which is mounted for sliding movement relative to the second table 38. The frame 72 includes a pair of spaced apart, generally parallel end plates 76,78 being rigidly interconnected together by a pair of spaced apart, generally parallel angle members 80,82 fixed to and extending between the corresponding opposite upper corners of the plates 76,78, as seen in FIG. 5. Each of the end plates 76,78 have a pair of spaced apart circular openings 84 defined therein (only end plates 76 being seen in FIG. 5) through which extends generally parallel elongated bars 86,88 upon which the frame 74 is mounted for sliding movement in a generally linear path defined by the bars 86,88. The opposite end portions of the bars 86,88 extend through openings in the respective end braces 90,92 which are fixed to the underside of the second table platform assembly 47. A cotter pin 94 extends through each end portion of the bars 86,88 adjacent the outer sides of the braces 90,92 to insure retention of the bars 86,88 in the mounted relationship through the end braces 90,92. The outer brace 92, which is adjacent the loader side 96 of the second table 38, is disposed closer to the forward edge 98 of the second table platform assembly 47 than is the inner brace 90. Therefore, the linear path defined by the bars 86,88 extends diagonally or angularly toward the front right corner of the second table 38, as seen in FIG. 3, where the forward transverse edge 98 and loader side 96 of the second table 38 meet.

The apparatus 72 further includes, preferably, a pair of bale-engaging elements 100 being spaced apart in the direction of the linear path of movement of the slidable frame 74 and mounted on the respective end plates 76,78 thereof.

Each of the elements 100 includes a cleat 102 being in the form of a generally rectangular thin plate which has an upper forward edge 104 which tapers upwardly and rearwardly (FIG. 5). Such tapered edge 104 minimizes the chance that the binding material of a bale will hang up or catch on the cleat, and also lessens resistance to movement of the bale itself, when the bale is moved rearwardly off the cleats upon the subsequent delivery of bales to the forward portion of the second table platform assembly 47. Each cleat 102 extends widthwise across the linear path of movement of the frame 74 and upwardly from the frame 74 and through a respective one of two elongated spaced apart slots or openings 106 being formed in the platform assembly 47 (the location of the slots being shown in broken line form in FIG. 3) and longitudinally aligned along the linear path of movement of the cleats 102 with the frame 74.

Each of the bale-engaging elements 100 further includes a generally U-shaped bracket 108 having a base portion 110 and leg portions 112 which are spaced apart and extend parallel to each other outwardly from opposite vertical edges of the base portion 110. The lower section of each cleat 102 has a central slot 114 formed therein which opens at the lower edge of the cleat 102 and extends upwardly therefrom through somewhat less than one-half of the height of the cleat 102. The cleat 102 at its lower section is disposed between the leg portions 112 of the bracket 108 and is clamp to the interior surface of the base portion 110 thereof by a bolt 116 which extends through the central vertical slot 114 and a centrally-located opening 118 formed through the base portion 110. By unloosing the bolt 116, the cleat 102 may be then moved either up or down relative to the bracket 108 in order to adjust the height of the upper section of the cleat 102 relative to the top surface of the second table platform assembly 47. Once the new height is reached, the bolt 116 is re-tightened.

A pair of mounting tabs 120 are fixed to and extend parallel to each other and outwardly from the corresponding sides of the end plates 76,78 which face toward the bale loader side 96 of the second table 38. Each of the tabs 120 of one pair thereof are spaced apart from one another sufficient to receive the spaced apart leg portions 112 of one of the brackets 108 therebetween. A bolt 122 respectively extends through aligned openings formed in each of the bracket leg portions 112 and its adjacently-disposed one of the tabs 120 so as to pivotally mount the bracket 108 and the cleat 102 carried by the bracket 108 for vertical pivotal movement about a horizontal axis defined by the bolts 122.

Each of the cleats 102 is normally disposed in a generally upright disposition due to the action of a biasing spring 124 and the position of a stop 126 incorporated by the apparatus 72. An elongated strip 128 is fixedly mounted at one end to the underside of each respective one of the end plates 76,78 and extends outwardly therefrom adjacent the front one of the mounting tabs 120 through a distance considerably greater than the extent of the pair of mounting tabs 120 from the end plates 76,78. The upturned outer free end 130 of the strip 128 has a hole formed therein which receives and anchors the looped outer end of one of the springs 124. The inner end of each spring 124 is looped through a hole formed in the lower forward corner area of the base portion 110 of the U-shaped bracket 108 of each one of the bale-engaging elements 100. As shown in FIG. 5, the cleat 102 has a notch formed therein adjacent to such corner area of the bracket 108 so as to allow for such anchoring of the inner end of the spring 124 to the bracket base portion 110. Consequently, as viewed in FIG. 4, each of the brackets 108 and thus the respective cleats 102 being mounted thereto are biased by its respective one of the springs 124 toward clockwise pivotal movement about the horizontal axes defined by bolts 122. However, the imposition of an upturned end of a short strip 132 at a predetermined location across the path of pivotal movement of each one of the brackets 108 retains each cleat 102 in a generally upright disposition. The short strip 132 is also fixedly mounted at its inner end to the underside of each respective one of the end plates 76,78 and extends outwardly therefrom in spaced apart parallel relationship to the elongated strip 128. However, the short strip 132 terminates into its upturned stop end just outwardly of each of the brackets 108.

For moving the slidable frame 74 and therewith the cleats 102 along the diagonally-extending linear path, a compression spring 134 (FIG. 2) and a cable and pulley system, generally designated as 136, are provided by the improved apparatus 72. The spring 134 is confined within a hollow tube 138 securely mounted fore-and-aft along the underside of the second table platform assembly 47. The rearward end of the spring 134 is interconnected by an end portion 140 of a cable 142 of the system 136 to the slidable frame 74. Specifically, a pair of parallel spaced apart tabs 144 being attached to the inwardly facing side of the inner end plate 76 and depending downwardly therefrom mount a pin element 146 which extends between the tab 144. Also, a pulley 148 is rotatably mounted to the outer free end of a brace element 150 which is attached at its opposite end to the platform assembly 47. The brace element 150 disposes the pulley 148 in generally fore-and-aft alignment with the tube 138 which contains the spring 134. The pulley 148 is also generally aligned with the tabs 144 within the linear path of movement of the frame 74. The cable end portion 140 is attached to and extends from the spring 134 through the forward open end of the tube 138, toward and around the pulley 148 and therefrom toward the pin element 146 mounted between the tabs 144. The cable portion 140 is wound several times about the pin element 146 so as to, in effect, form a fixed connection with the pin element 146. The cable may also be fixed to the pin element by an eyelet in the cable.

Figure 2:
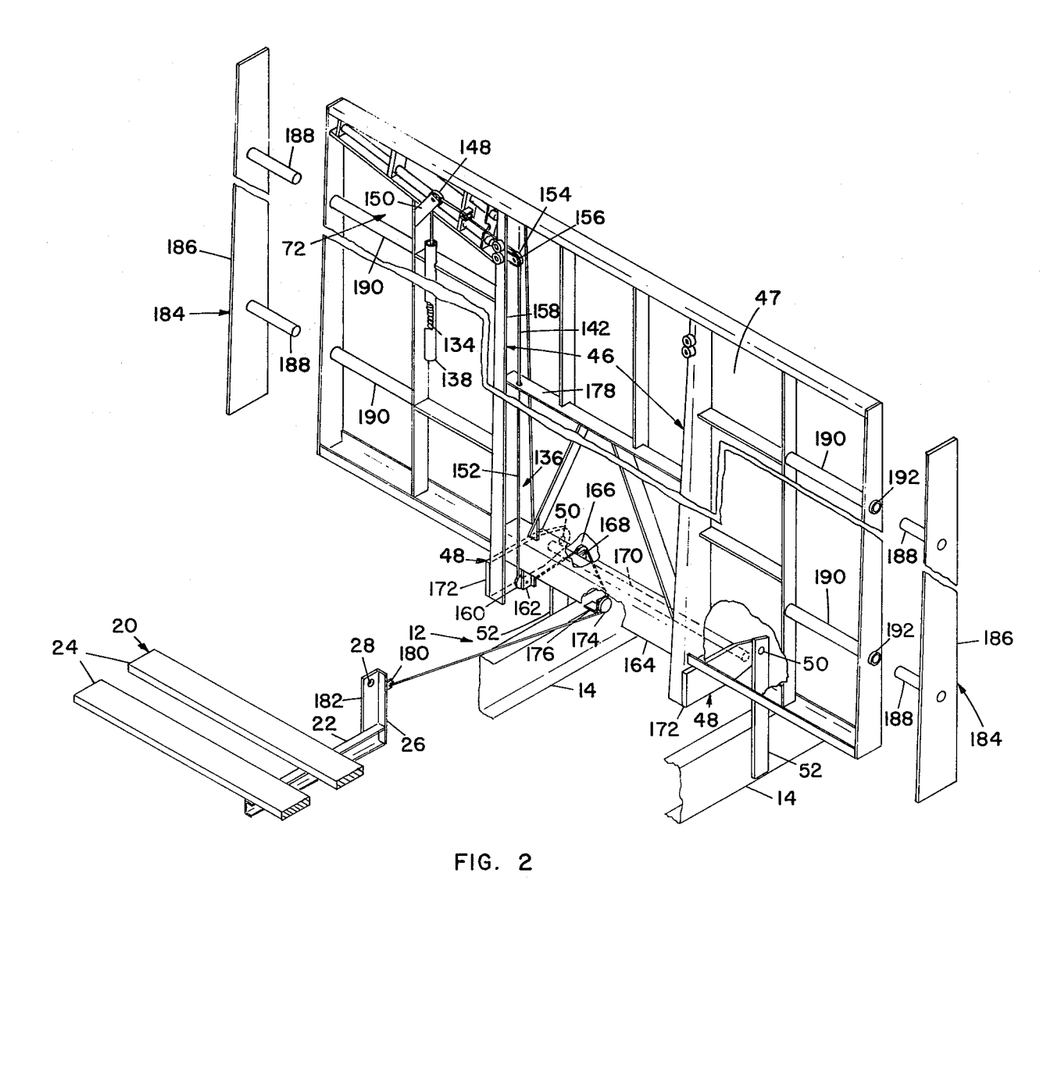
FIG. 2 is a fragmentary perspective view of the bale wagon, on a somewhat larger scale than that of FIG. 1, with the second table disposed in its generally upright position to expose the structure of the improved apparatus mounted on the underside of the second table and the path taken by the cable of the apparatus which interconnects the slidable cleat-bearing frame to the first table of the bale wagon.

The remaining portion 152 of the cable 142 is much longer than end portion 140 so that it will reach from the pin element 146 on the slidable frame 74 to the first table 20 along the predetermined path illustrated in FIG. 2 defined by a series of pulleys mounted on the second table 38 and right longitudinal channel 14.

A first pulley 154 of the series of pulleys is rotatably mounted above the free end of a tab 156 being fixed at its opposite end to a right fore-and-aft extending channel 158 of the forward extending leg portion 46 of the second table 38 a short distance rearwardly from the forward edge 98 of the second table 38. The first pulley 154 is disposed in general alignment with the pulley 148 and the tabs 144.

A second pulley 160 of the series of pulleys, being generally aligned fore-and-aft with the first pulley 148, is rotatably mounted on the outer side of a bracket 162 being fixed on and extending rearwardly and slightly downwardly from the rear side of a transverse tubular beam 164 of the second table 38 which extends between and interconnects the right and left channels 158 of the second table leg portion 46 adjacent the rear ends thereof.

A third pulley 166 of the series of pulleys is rotatably mounted on the outer side of a tab 168 being fixed on and extending upwardly (when the second table 38 is in its lower position) from a cross tube 170 which extends between and interconnects the right and left plates 172 of the second table rear leg portion 48. The cross tube 170 is mounted to the plates 172 just below the pivotal connections 50 of the plates 172 to the upstanding brackets 52 and the tab 168 is mounted near the right end of the cross tube 170 such that the third pulley is disposed in generally vertical alignment with the second pulley 160 and right longitudinal channel 14 and in co-axial alignment with the pivotal connections 50.

A fourth pulley 174 of the series of pulleys, being disposed in generally vertical alignment with the third pulley 166, is rotatably mounted to the inner side of a bracket 176 being fixed on and extending upwardly from the right longitudinal channel 14 at a location somewhat rearwardly of the mounting location of the right upstanding bracket 52.

Figure 8:
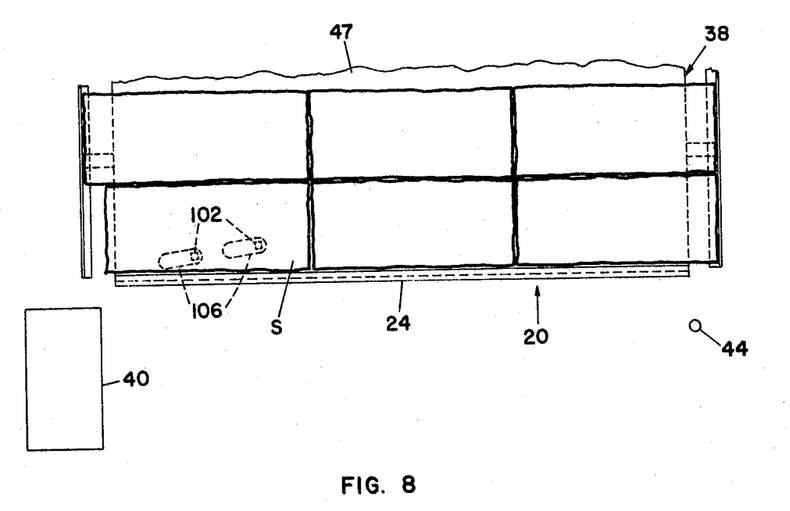
Figure 9:
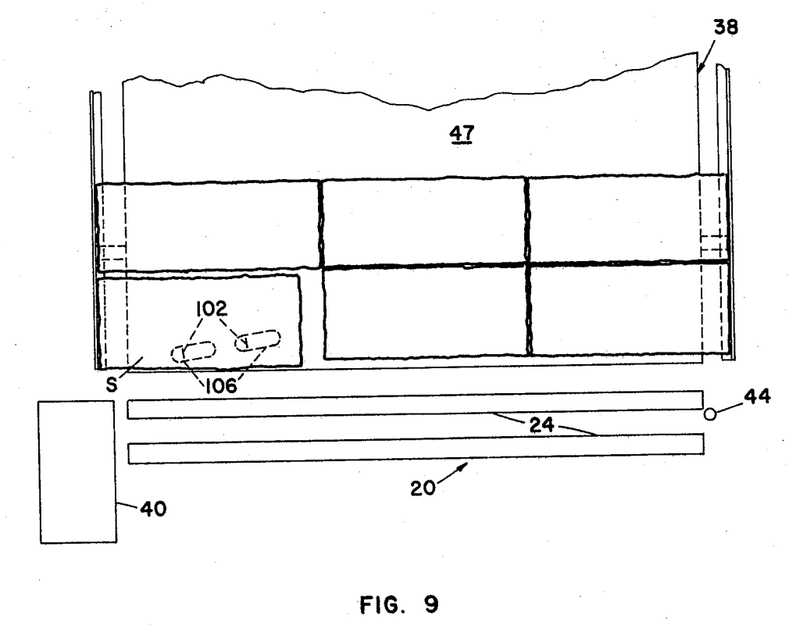

The remaining portion 152 of the cable 142 extends from the pin element 146 on the slidable frame 74 to and about the inner side of the first pulley 154, therefrom rearwardly through a hole in a cross member 178 of the platform assembly 47 to and about the lower side of the second pulley 160, therefrom to and about the upper side of the third pulley 166, therefrom to and about the lower side of the fourth pulley 174, and, finally, therefrom forwardly along and above the right longitudinal channel 14 to the forward end of the cable portion 152 which is pivotally connected to tab 180 being fixed to and extending rearwardly from the right angle member 182 of the first table leg portion 26. The tab 180 is fixed to the member 182 a short distance below the pivotal connection 28 of the member 182 to the right upstanding front bracket 30. The length of the remaining portion 152 of the cable 142 is such that when the first table 20 is disposed at its lower position, as seen in FIGS. 1 and 2, the spring 134 biases the slidable frame 74 and the cleats 102 therewith to an outer position, as shown in FIGS. 3 and 9, toward the bale loader side 96 of the second table 38 and when the first table 20 is pivoted upwardly during delivery of bales to the second table 38, the cable portion 152 pulls the frame 74 and the cleats 102 therewith to an inner position, as seen in FIG. 8, toward the longitudinal centerline of the second table platform assembly 47 which results in compression of the spring 134 within the tube 138 via the end portion 140 of the cable 142. Once the bales have been deposited on the second table 38, descent of the first table 20 back downwardly progressively releases the pulling force of the cable portion 152 imposed on the frame 74 and concurrently as the force releases, the contracted spring 134 extends and pulls the frame 74 and the cleats 102 therewith via cable portion 140 back to the outer position toward the side 96 of the second table 38. Therefore, the velocity of movement of the slidable frame 74 and cleats 102 is controlled by the velocity of the downward descent of the first table 20, the latter being determined by the pull of gravity.

Also, due to the fact that the cable portion 152 extends about the third pulley 166 which is rotatably mounted in co-axial alignment with the pivotal connections 50 of the second table 38 to the upstanding brackets 52, pivotal cycling of the second table 38 about the horizontal axis defined at 50 between its lower and upper positions for delivery of a tier to the load bed 58 of the bale wagon does not cause any pulling forces to be imposed on the cable. Consequently, only pivotal movement of the first table 20 causes movement of the slidable frame 74 and cleats 102, the predetermined path of the cable 142 being adapted to accommodate pivotal movement of the second table without causing movement of the frame 74.

The position of the slidable frame 74 may be adjusted by adjusting the position of either one or both of the second and fourth pulleys 160,174 along their respective brackets 162,176. The second and fourth pulleys 160,174 are mounted to the respective brackets 162,176 by fasteners which extend through elongated slots formed therein. By unloosening the fasteners the pulleys may be slid along the respective slots to the desired adjusted position. Then, the fasteners are re-tightened to retain the pulleys at such positions.

The outer position or location on the second table 38 to which a bale may be repositioned thereon is bounded on its outer side by the right one of a pair of side rails 184 respectively adjustably mounted to the opposite sides of the second table platform assembly 47. Each of the side rails 184 includes an elongated vertical generally planar portion 186 and a pair of fore-and-aft spaced apart tubular portions 188 being fixed to and extending inwardly from the planar portion 186. The tubular portions 188 are respectively received within correspondingly spaced apart tubular members 190 being mounted transversely on the underside of the platform assembly 47 adjacent each of the sides thereof and aligned with openings 192 formed in the vertical sides of the platform assembly 47 such that the planar portions 186 extend generally parallel and above the respective sides of the platform assembly 47. Set screws are utilized to retain the tubular positions 188 within the respective tubular members 190 so as to dispose each of the planar portions 186 of the side rails 184 at a desired position relative to the respective sides of the platform assembly 47.

Operation of the Improved Bale Repositioning Apparatus

FIGS. 6 through 9 schematically illustrate the operation of the improved repositioning apparatus 72 in repositioning a short bale S on the second table 38 of the bale wagon 10 to a desired outer position adjacent the bale loader side of the second table 38 to provide an even right side for the tier being formed on the table 38 and consequently for the stack which is formed when by successive transfer of tiers to the load bed 58 of the bale wagon.

Figure 6:
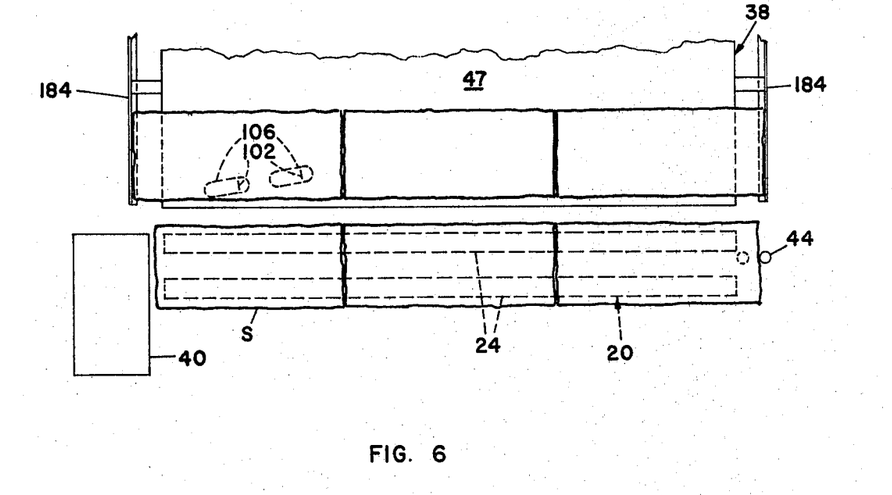
FIGS. 6 through 9 are schematic representations of the operation of the improved apparatus in repositioning a short bale on the second table of the bale wagon.

FIG. 6 illustrates a first end-to-end row of three generally standard length bales disposed transversely across the forward end portion of the platform assembly 47 of the second table 38 between the right and left side rails 184 therealong. Since all of the bales are of generally standard length, the cleats 102 were retained by the material of the bale being located adjacent the loader side of the second table 38 and prevented from being fully moved back to their outer position by the spring 134 when the first table 20 descended back to its lower position after delivery of the row of standard length bales to the second table 38.

Also, in FIG. 6, there is illustrated a second end-to-end row of bales having been loaded onto the first table and moved sufficiently toward the left end thereof to engage and pivot the first table trip arm 44 laterally outward from its broken line position to the solid line position at which it causes actuation of the hydraulic cylinder 32 (FIG. 1) for initiating the pivotal cycling of the first table 20.

It will be noted that the outer end of the bale engaged with the first table trip arm 44 will always be evenly aligned with the outer end of the bale (or bales) positioned on the second table 38 adjacent the trip arm side thereof, since as soon as the first table 20 begins to pivot upwardly the bales thereon are lifted out of contact with the cross conveyor 42 (FIG. 1) and their transverse movement toward the left end of the first table 20 thus terminates.

The bale S of the three bales in the second row thereof on the first table 20 is noticeably shorter in length than the other two. Consequently, its trailing end had moved to the right out of alignment with the outer end of the bale positioned on the second table 38 adjacent its loader side by the time the outer end of the leading bale engaged and outwardly pivoted the trip arm 44 to actuate the first table cycling.

Figure 4:
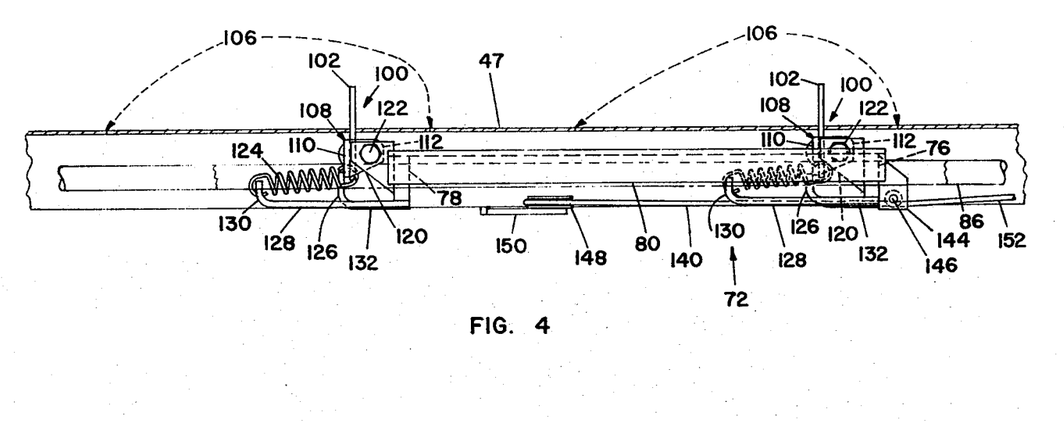
FIG. 4 is a front elevational view taken along line 4—4 of FIG. 3.
Figure 7:
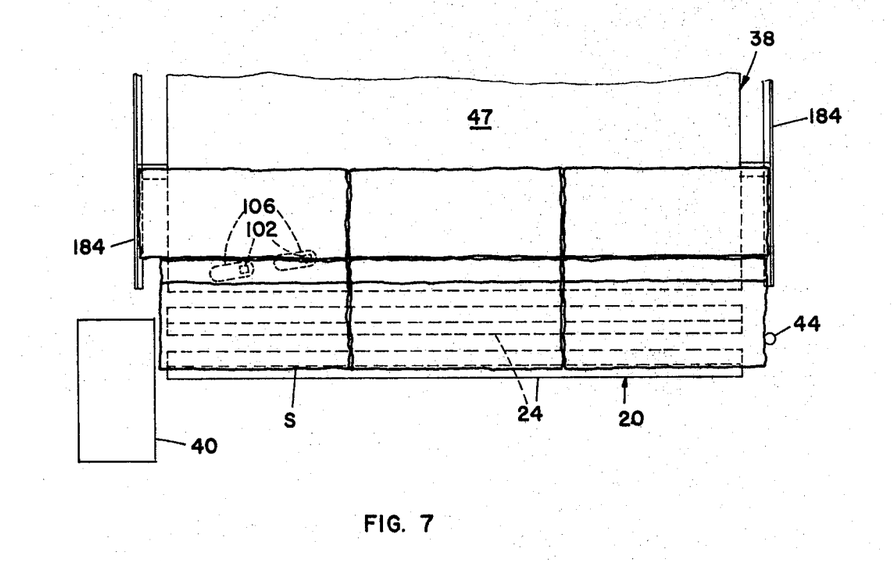

FIG. 7 illustrates the first table 20 during its upward pivotal movement wherein the bales thereon have reached the forward edge of the second table platform assembly 47 and started to push the three bales on the platform assembly 47 rearwardly. As the first table 20 reaches its upper position, the frame 74 and cleats 102 will have been pulled to their inner position toward the centerline of the second table 38. Such movement of the cleats 102 relative to the bales forces them to deflect downwardly (pivot counterclockwise as seen in FIG. 4) against the biasing of their respective springs 124 (FIG. 4).

FIG. 8 illustrates the first table 20 having reached its upper position and just beginning its downward descent. Therefore, the second row of bales, which includes the short bale S, have now been deposited on the forward end portion of the platform assembly 47 of the second table 38. The short bale S now overlies the slots 106 and the cleats 102. As the first table 20 starts in downward descent, the spring 134 begins to extend due to the diminishing of the pull on the slidable frame by the cable portion 152. Consequently, the frame 74 and therewith the cleats 102 begin to move along the diagonally-extending linear path toward the loader side of the second table 38. Such movement of the cleats 102 causes the top ends thereof to engage and embed into the material of the short bale S and instantaneously pivot clockwise back to their upright positions of FIG. 4 and thus carry the bale S along with them until either the frame 74 reaches the outer position or the outer end of the bale S abuts the right side rail 184, as seen in FIG. 9. It will be noted that the short bale was moved forwardly as well as laterally by the cleats 102 and thereby away from the bale positioned just to its rear. Consequently, the rear bale did not interfere with the repositioning of bale S.

It should also be mentioned that if the short bale S appears at the position of either of the two other bales in the second row of bales instead of the position depicted in FIGS. 6 through 9, the same unevenness at the loader side of the tier of bales being formed on the second table 38 will be rectified in the manner just described by the cleats 102 causing the relocation of the one bale overlying the slots 106. In other words, for the problem of unevenness of the stack side at the loader side of the bale wagon to be corrected by the repositioning apparatus 72 of the present invention, it makes no difference where in the stack the short bale or bales are located.

It is thought that the improved bale repositioning apparatus of the present invention and many of its attendant advantages will be understood from the foregoing description and it will be apparent that various changes may be made in the form, construction and arrangement of its parts without departing from the spirit and scope of the invention or sacrificing all of its material advantages, the form hereinbefore described being merely a preferred or exemplary embodiment thereof.

Having thus described the invention, what is claimed is:

1. In a bale wagon having means for accumulating bales into a tier including a bale-supporting surface with at least one opening therein defining a generally linear path, and means disposed at a first position for receiving bales and movable to a second position for transferring bales to said bale-accumulating means, an improved apparatus for repositioning selected bales on said bale-accumulating means, said improved apparatus comprising:

bale engaging means including a frame mounted for sliding movement along said path and below said bale-supporting surface of said bale-accumulating means and at least one element mounted on and extending upwardly from said frame and through said opening to above said bale-supporting surface to where said element will engage a bale overlying said opening and move the same along said path of movement of said frame to reposition said bale;

means mounting said bale-engaging means for movement relative to said bale accumulating means for repositioning at least one selected bale thereon; and means for moving said bale-engaging means along said path including yieldable means in the form of a spring or the like mounted below said bale-supporting surface of said bale-accumulating means and interconnected to said slidable frame so as to bias the same and thereby said at least one element mounted thereon toward the location on said bale-accumulating means to where said bale is to be repositioned, a flexible member in the form of a cable or the like interconnecting said slidable frame and said bale-receiving means such that movement of the latter from said first to said second position in transferring bales to said bale-accumulating means pulls said slidable frame away from said location against said biasing of said yieldable means, while movement of said bale-receiving means from said second position back to said first position after transferring bales to said bale-accumulating means releases the pull on said slidable frame and thereby concurrently allows said yieldable means to cause said slidable frame to move back toward said location.

2. A bale wagon as recited in claim 1, wherein said at least one bale-engaging element is a cleat pivotally mounted on said frame and biased to normally extend in an upright disposition upwardly through said opening in said bale-supporting surface of said bale-accumulating means during movement of said frame and said element therewith in repositioning said bale, said cleat being pivotally movable downwardly during reverse movement of said frame in preparation for repositioning of said bale.

3. In a bale wagon having means for accumulating bales into a tier and means for receiving bales and transferring bales to said bale-accumulating means, an improved apparatus for repositioning selected bales on said bale-accumulating means, said improved apparatus comprising:

bale-engaging means;

means mounting said bale-engaging means for lateral movement relative to said bale-accumulating means and at an angle skewed from the axis of the other bales on said bale-accumulating means for repositioning said selected bale on said bale-accumulating means without interference from said other bales thereon; and means for moving said bale-engaging means to reposition said bale on said bale-accumulating means.

4. In a bale wagon having a chassis, a load bed on said chassis for accumulating tiers of bales into a stack thereof, a tier-forming table pivotally mounted on said chassis about a transverse axis adjacent said load bed, means for pivotally moving said table about said axis between a lower position wherein bales are received and accumulated into a tier on said table and an upper position wherein said tier is transferred to said load bed and bale-receiving means on said chassis disposed at a first position for receiving bales and movable to a second position for transferring bales to said table, an improved apparatus for repositioning selected bales on said table, said improved apparatus comprising:

bale-engaging means;

means mounting said bale-engaging means on said table for movement relative thereto for repositioning at least one selected bale thereon;

an element mounted substantially coincident with said transverse pivotal axis of said table; and flexible cable-like means extending along a predetermined path from said bale-engaging means about said element and therefrom to said bale-receiving means and being movable upon movement of said bale-receiving means for transmitting the movement of the latter to said bale-engaging means for repositioning said at least one selected bale, said path of said flexible means, due to its extension about said element at said pivot axis of said table, being adapted to accommodate the pivotal movement of said table when transferring a tier to said load bed without causing any appreciable movement of said bale-engaging means relative to said table during such movement of the latter.

* * * * *